5815X
S. Silliman,
Washing Machine,
Patented Feb. 3, 1830.
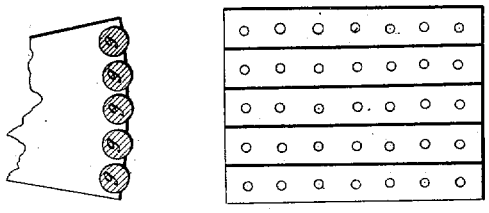
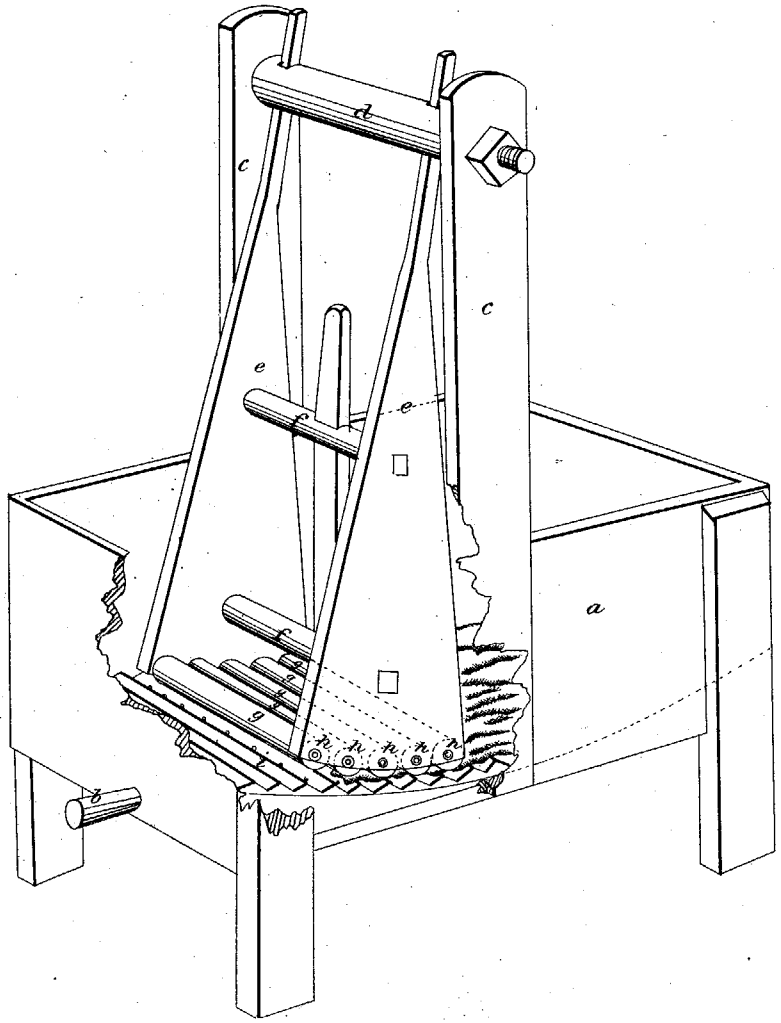
N. PETERS, PHOTO-LITHOGRAPHER, WASHINGTON, D. C

Samuel Silliman

Letters Patent.

The schedule referred to in these Letters Patent and making part
of the same containing a description in the words of the said Samuel
Silliman himself of his improvement in the machine for washing
clothes, called the vibrating Washing Machine —

To all persons to whom these presents shall come greeting.
Be it known that I Samuel Silliman of Saybrook in the County
of Middlesex and State of Connecticut, have invented, constructed,
made, and applied to use a new and useful improvement in the
washing Machine, called the vibrating Washing machine. The
schedule and specification of which is as follows, viz —

A rectangular oblong tub three feet long one & a half feet wide
and fourteen inches high, standing on four legs or feet of sufficient
height for convenience — one end an inch lower than the other, with
a faucet or plug at the lowermost end in the bottom, to draw
off the water — two posts three or four inches wide & an inch
thick erected one on each side of the tub, equidistant from the
ends and secured on the outside by screws or otherwise with a
hole near the upper end of an inch in diameter & about four feet
and a half above the bottom of the tub to receive the pivot or shaft The shaft has an arbor, on each end fitted to the hole, in the posts
with a shoulder & a nut of hard wood screwed or otherwise fasten-
ed in the body to keep the posts to the shoulders. Through the shaft
a little within the shoulders are two mortises of an inch square thro
which the vibrating frame slides up and down. The vibrating frame
is made of hard wood and consists of two side pieces made of boards
an inch thick and about nine inches wide at the lower end and
[illegible] formed the upper end to the size of the mortises in the shaft
the upper end fitting the mortises so as to slide up and down,

X5815

The side pieces are secured at such a distance apart as to move in the
the tub & made firm by two rails or cross pieces framed into the side pieces
one near the lower end and the other near the middle. At the center
of the upper one is attached the handle & at the center of the lower one
the brace which unites with and supports the handle — At the bottom
of the vibrating frame are five wooden rollers of an inch & a half diame-
ter, one fourth of an inch distant from each other with iron or other me-
tallic arbors or centres at the end fitted to and running in boxes of pew-
ter or composition & attached to the bottom of the side pieces —
The line of the rollers conforms to the sweep of the vibrating frame. The
wash board is a loose floor filling the inside of the tub, raised from
the bottom and secured by placing two ribs made of boards an inch
thick, one on each side of the tub — The upper side being made circular
on which are nailed or otherwise secured boards fluted on the upper
side running crosswise of the tub and perforated with holes in the
flutes, three eighths of an inch in diameter & two inches apart —
The wash board at the middle is about one and a half inch from
the bottom of the tub & rises towards the ends of the tub to the
sweep of the vibrating frame. & may be taken out at pleasure.
In the operation of the machine, the clothes to be washed are spread
upon the wash board — water is put into the tub sufficient to
make the washboard float. the rollers are then made to pass over
the clothes with the weight of the vibrating frame upon them —
The rollers may be increased in number or diminished & the ma-
chine may be enlarged or diminished according to the amount of
washing required. The washboard detached from the tub, perforated
and raised from the bottom — the rollers attached to the vibrating
frame with metalic arbors and boxes in the manner described
aforesaid with the [illegible] of the frame in the [illegible] of the shaft
together with the handle placed as aforesaid, are claimed as an in-
vention [illegible] application in the washing machine.
The machine may be moved by hand or [illegible]
by horse or water power by [illegible] a [illegible] to the [illegible]

same I annex with a seal to the petition.

In testimony that the foregoing is a true specification & schedule of my improvement as above described I have hereunto set my hand & seal this 17th day of December, A.D. 1839.

Witnesses

Robert Peters } Samuel Sillsman Esq.
Eli Warren } Chf.